United States Patent [19]
Bollé et al.

[11] Patent Number: 5,032,017
[45] Date of Patent: Jul. 16, 1991

[54] SPECTACLES COMPRISING MEANS FOR QUICKLY FITTING THE SIDE-PIECES AND THE NOSE-PIECE

[75] Inventors: Maurice Bollé; Robert Bollé, both of Oyonnax, France

[73] Assignee: Etablissements Bolle Georges, Robert et Maurice, Oyonnax, France

[21] Appl. No.: 383,547

[22] Filed: Jul. 24, 1989

[30] Foreign Application Priority Data

Jul. 26, 1988 [FR] France .................... 88 10051

[51] Int. Cl.⁵ .................... G02C 5/14; G02C 5/22
[52] U.S. Cl. .................... 351/116; 351/138; 351/153
[58] Field of Search ............ 351/116, 138, 153, 158

[56] References Cited
U.S. PATENT DOCUMENTS

| | | | |
|---|---|---|---|
| 1,099,404 | 6/1914 | Spery | 351/116 |
| 4,488,792 | 12/1984 | Wagner | 351/153 |
| 4,670,915 | 6/1987 | Evans | 351/116 |
| 4,741,611 | 5/1988 | Burns | 351/44 |
| 4,744,646 | 5/1988 | Stewart | 351/153 |

FOREIGN PATENT DOCUMENTS 0273650 7/1988 European Pat. Off. .
2565368 12/1985 France .

*Primary Examiner*—Paul M. Dzierzynski
*Attorney, Agent, or Firm*—Fleit, Jacobson, Cohn, Price, Holman & Stern

[57] ABSTRACT

The invention relates to spectacles comprising two eyepieces (2, 3) joined by a bridge (4), each eyepiece comprising a first end by which it is connected to the said bridge, and a second end, remote from the first one, to which is fixed a side-piece (21, 22).

According to the invention, each side-piece has on one end a clip (23, 24) comprising two wings placed opposite each other, between which extends the said second end of the eyepiece, one of the wings bearing elastic retaining means arranged to cooperate with corresponding means provided on the eyepiece (2, 3) in such a way as to ensure a given positioning of the clip in relation to the eyepiece.

Application to the manufacture of novelty spectacles.

5 Claims, 2 Drawing Sheets

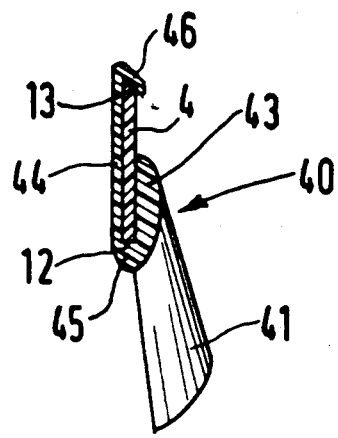
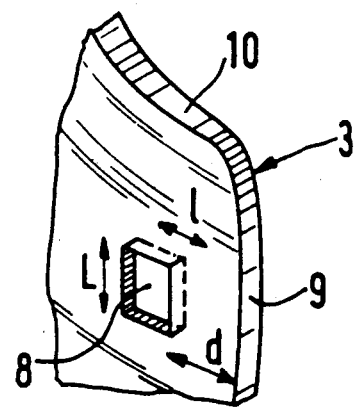
FIG.5    FIG.6
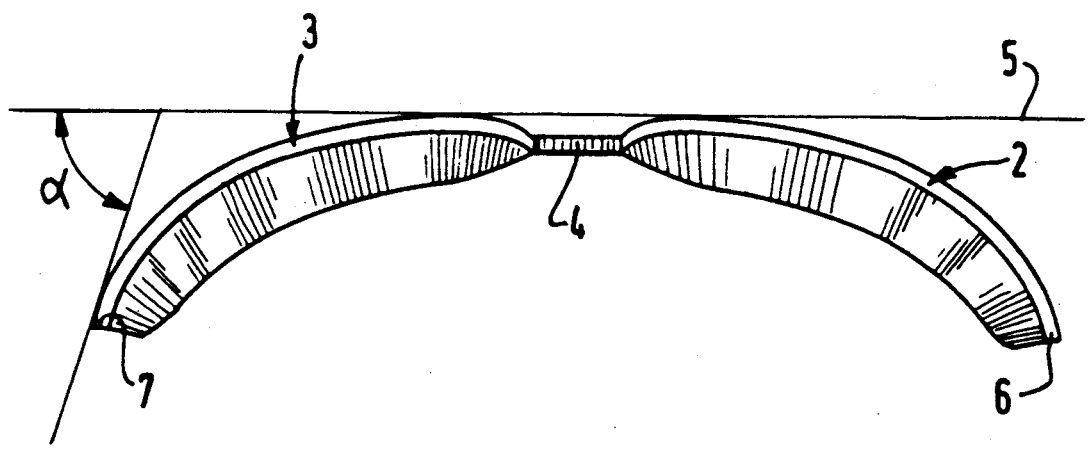
FIG.7

SPECTACLES COMPRISING MEANS FOR QUICKLY FITTING THE SIDE-PIECES AND THE NOSE-PIECE

The invention relates to spectacles comprising two eyepieces joined by a bridge, each eyepiece comprising a first end by which it is connected to the said bridge and a second end, remote from the first, to which is fixed a side-piece.

The object of the invention is to provide spectacles that are simple in design, inexpensive and enable the side-pieces and the nose-piece to be fitted quickly.

According to the invention, each side-piece comprises at one end a clip including two wings arranged facing each other, between which extends the said second end of the eyepiece, one of the wings bearing elastic securing means arranged to cooperate with corresponding means provided on the eyepiece.

Advantageously, the said clip is made of a material having a certain elasticity and the said wing bears a catch on one face turned towards the other wing, the second end of the eyepiece having a mortice arranged to receive the said catch.

Advantageously, the said mortice is a window that traverses the eyepiece.

Advantageously, each eyepiece is curved so that its second said end extends towards the user's face.

According to a preferred form of embodiment, the spectacles include a nose-piece having two pads interconnected by a bridge and elastic securing means arranged to cooperate with corresponding means provided on the spectacles.

Advantageously, the nose-piece is arranged to straddle a first edge of the bridge connecting the said eyepieces, and it is fitted with a mounting tab that is of a material having a certain elasticity, which comprises one end by which it is connected to the nose-piece and an opposite, hook-shaped end, arranged to cooperate with a second edge of the said bridge, opposite the first.

Advantageously, the two eyepieces and the said bridge are in a single piece.

Further details and advantages of the invention will become apparent in the course of the following description of a preferred, but not limitative, embodiment, with reference to the annexed drawings, wherein:

FIG. 5 is a cross-sectional view along line V—V of FIG. 1;

FIG. 6 is a perspective detail showing one of the two mortices provided in the spectacles; and FIG. 7 is a top view of the optical system of the spectacles.

Figure 1:
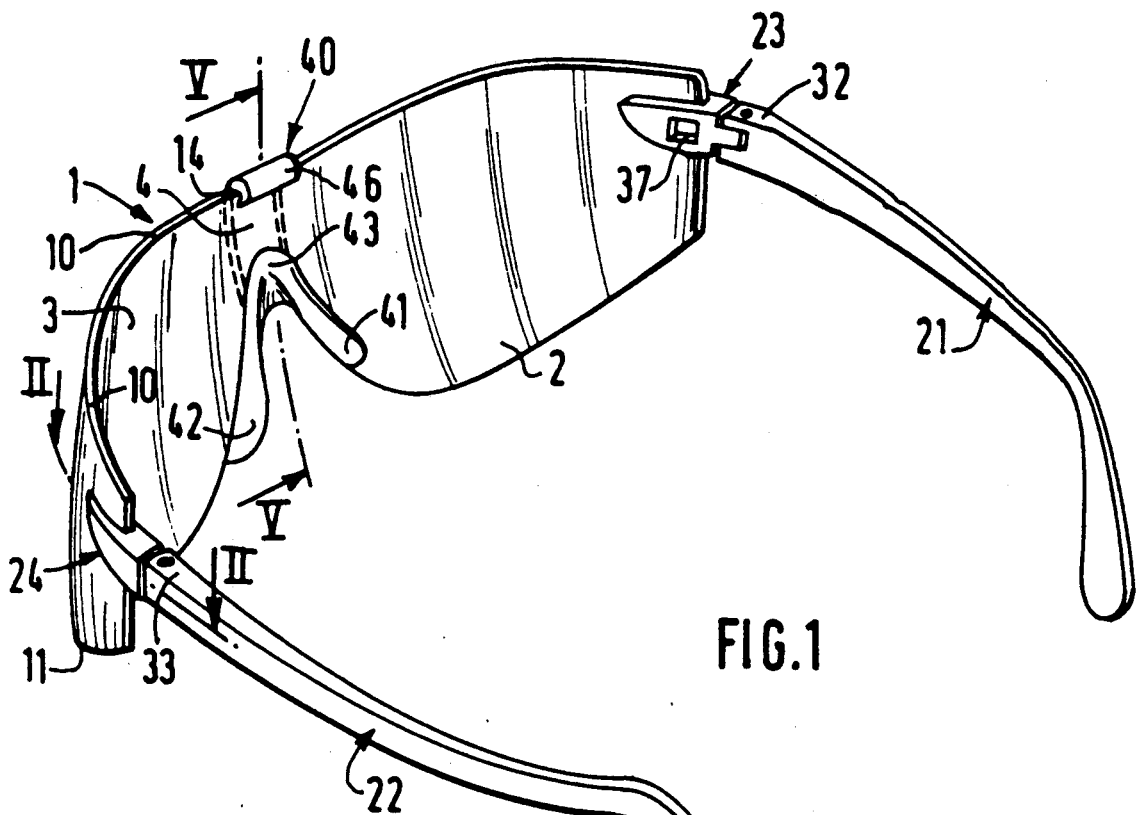
FIG. 1 is a perspective view of the spectacles according to the invention.
Figure 3:
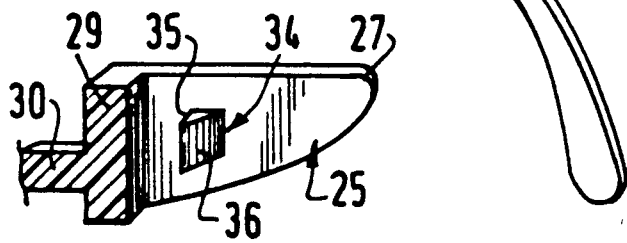
FIGS. 3 and 4 are cross-sectional views respectively in the direction of arrows III—III and arrows IV—IV of FIG. 2.
Figure 2:
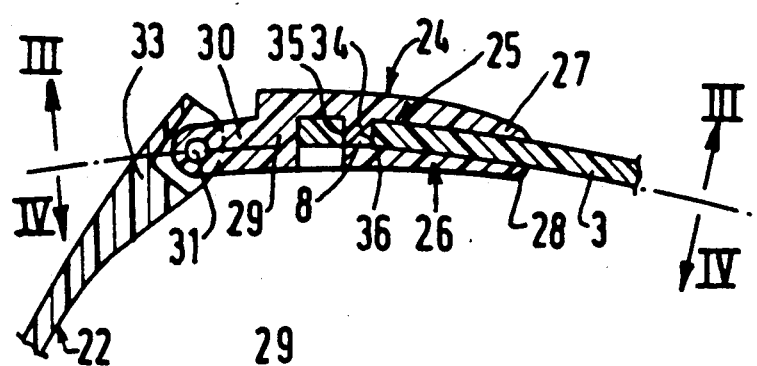
FIG. 2 is a cross-sectional view along line II—II of FIG. 1.
Figure 4:
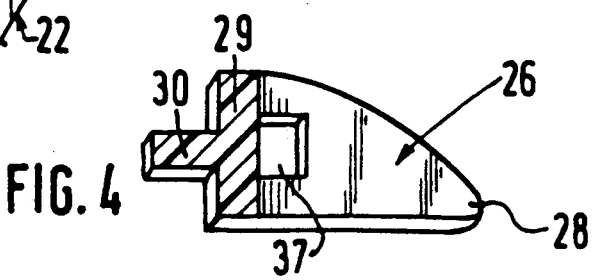

The spectacles 1 shown in FIGS. 1 and 7 comprise an optical system composed of two eyepieces, a right-hand one 2 and a left-hand one 3, interconnected by a bridge 4. Each eyepiece is very distinctly curved with a curvature of base 10 H (horizontal) and base 5 V (vertical); if we consider a vertical plane 5 extending along the two eyepieces and resting on both of them, the end 6, 7 of each eyepiece 2, 3 remote from the bridge 4 forms an angle α with plane 5 which is preferably of between 60° and 80°, and equal in particular to approximately 70°.

Each eyepiece 2, 3 has a mortice 8 (FIG. 6) constituted by a rectangular window situated in the said end 6, 7, very close to the side edge 9 of the eyepiece, and nearer to the upper edge 10 of the eyepiece than to its lower edge 11. The mortice 8 extends along the side edge 9 of the eyepiece. Between eyepieces 2, 3, bridge 4 is delimited by a lower horizontal edge 12 and an upper horizontal edge 13, the latter forming a bevel turned towards the user's face.

The optical system is made of a plastic material, in particular of polycarbonate, and it is moulded in a single piece.

The spectacles 1 are fitted with two side-pieces 21, 22 comprising, at one end, 32, 33, a clip, 23, 24. Each clip has two wings, 25, 26, arranged facing each other and interconnected by a common edge 29 extending in a straight line, in such a way that they are spaced apart by a distance corresponding to the thickness of eyepieces 2, 3. More precisely, this distance very slightly exceeds the thickness of the eyepieces in the vicinity of the common edge 29 of the wings, and it decreases slightly up to their opposite free end 27, 28, where it is slightly less than the thickness of the eyepieces so as to produce a pinching effect.

Each clip 23, 24 has an extension 30 extending perpendicularly to the common edge 29 of the wings and traversed by a pin 31 parallel to this end. Pin 31 is borne by the end 32 of the corresponding side-piece 22, which has the form of a yoke.

A wing 25 of each clip 23, 24, bears, on its face turned towards the other wing 26, a catch 34 having, in particular, a face 35 perpendicular to wing 25 and facing the common edge 29 of the wings, and a face 36 inclined in relation to wing 25 and turned towards the free end 27 of the latter. The two faces, 35, 36 of the catch 34 define a wedge and extend along the common edge 29, over a distance slightly less than the length L of the mortice 8 of eyepieces 2, 3. The width of the catch 34, between the two faces 35, 36, is slightly less than the width 1 of mortice 8.

Furthermore, the distance between face 35 of catch 34 and the common edge 29 of the wings barely exceeds the distance d between mortice 8 of the side edge 9 of the eyepieces 2, 3. In addition, catch 34 projects from wing 25 by a height barely less than the thickness of eyepieces 2, 3.

The wing 26 of each clip 23, 24 opposite catch 34 has a window 37 facing the area of the opposite wing 25 between the common edge 29 of the wings and catch 34. This window is the result of the clip moulding conditions, according to which the moulding of face 35 of the catch necessitates the use of a core passing through wind 26 and enabling face 35 to be oriented in accordance with the desired orientation of the side-pieces.

Each clip is moulded from a plastic material, in particular polyamide, chosen so that its two wings 25, 26 have a certain elasticity.

When side-pieces 21, 22 are mounted on eyepieces 2, 3, each clip 23, 24 straddles the side edge 9 of the corresponding eyepiece, once ends 27, 28 of wings 25, 26 have been slightly parted. The clip is pushed towards the eyepiece until the common edge 29 of its wings comes into abutment with the side edge 9 of the eyepiece.

At the same time, catch 34 will have come into abutment with the side edge 9 of the eyepiece via its inclined face 36 and caused wings 25, 26 to part further until it drops into mortice 8 of the eyepiece.

As a result, clip 24 is fixed and immobilized on eyepiece 3. In particular, any possibility of clip 24 pivoting about its catch 34 is precluded by the fact that the common edge 29 of wings 25, 26 is kept pressed against the side wall 9 of the eyepiece by catch 34. This prevention of pivoting is all the better ensured in that the common edge 29 of the wings is long. In the present example, this edge is 9 mm long, while the catch is 4 mm long.

Given the considerable angle of inclination α of ends 6, 7 of the eyepieces in relation to vertical plane 5 (FIG. 7), the side-pieces are located, when the spectacles are worn by the user, in the prolongation of the clips 23, 24 (FIG. 1).

The spectacles 1 are further equipped with a V-shaped nose-piece 40 including two pads 41, 42 that rest on the nose, joined by a bridge 43. The nose-piece 40 also includes a mounting tab 44 extending partially opposite bridge 43, and partially beyond it, on the side opposite the said pads 41, 42. End 45 of the mounting tab 44 placed opposite bridge 43 is fixed thereto, while the opposite end, 46, forms an elbow turned towards bridge 43.

Mounting tab 44 delimits, together with bridge 43, a space the thickness of which is slightly less than the thickness of bridge 4 joining eyepieces 2, 3. Furthermore, the length of the mounting tab between its two ends, 45, 46 corresponds to the length of bridge 4 between its two edges, lower edge 12 and upper edge 13, while the width of mounting tab 44 corresponds to that of bridge 4.

The nose-piece is moulded from a plastic material, in particular polyamide, having a certain degree of elasticity.

When nose-piece 40 is fitted on the spectacles, it straddles the lower edge 12 of bridge 4 of the optical system. Once the nose-piece has come into abutment with this lower edge 12, the upper, elbow-shaped end 46 elastically straddles the bevelled upper edge 13 of bridge 4 and presses against it: the nose-piece is then snap fastened onto the spectacles.

Nose-piece 40 is laterally immobilized in relation to the spectacles as follows. The area of the end 45 of the mounting tab on the bridge 43 is blocked between the two eyepieces 2, 3. Moreover, owing to the presence of the upper bevelled edge 13 of bridge 4 of the optical system, two corners 14 are formed between this edge 13 and the flat upper edges 10 of the two eyepieces 2, 3. The elbow-shaped end 46 of mounting lug 44 is blocked between the two corners 14.

The nose-piece 40 can easily be removed by elastically disengaging elbow-shaped end 46 from the upper end of bridge 4. Each side-piece 21, 22 can be removed by separating wing 25 of each clip 23, 24 from the eyepiece 2, 3 using a lever so that catch 34 is disengaged from mortice 8.

Advantageously, a plurality of side-pieces and nose-pieces of different colours or shapes can be supplied with the spectacles, thus enabling the user to obtain a variety of aesthetic effects.

As an alternative to the form of embodiment described, the catch can be borne by the eyepiece while the mortice can be provided in one of the wings of the clip.

Moreover, the curvature of the eyepieces can be modified to obtain a tile-shaped or cylindrical curvature.

We claim:

1. Spectacles comprising two eyepieces joined by an eyepiece bridge, each eyepiece comprising a first end by which it is connected to the said bridge, and a second end remote from the first one, to which is fixed a side-piece, said second end of the eyepiece having a mortice of predetermined dimensions, disposed at a predetermined distance from a side edge of the eyepiece, each side-piece comprising at one end a clip having an elasticity and including two wings facing each other and joined together by an edge, one of said wings bearing a catch on a face turned towards the other wing, said catch having dimensions corresponding to those of said mortice, wherein said catch is disposed on said wing at a distance from said edge of said clip which is substantially equal to said predetermined distance between said mortice and said edge of the eyepiece, and it rests on said mortice, and said edge of said clip has a length substantially greater than the dimensions of said catch and longitudinally rests on said side edge of said eyepiece, a nose-piece in a material which is substantially rigid but has an elasticity, said nose-piece comprising two pads connected together by a nose-piece bridge and a mounting tab fixed by a first end to said nose-piece bridge and defining with the latter a space intended to receive a lower edge of said eyepiece bridge connecting said eyepieces, said mounting tab carrying at a second end a hook for snap hooking an upper edge of said eyepiece bridge.

2. Spectacles according to claim 1, in which said upper edge of that bridge connecting the eyepieces has a bevel which said hook of said mounting tab engages.

3. Spectacles according to claim 1, in which the side edge of each eyepiece and said edge of each side-piece are straight.

4. Spectacles according to claim 1, in which each catch extends on a surface of predetermined dimensions of said wing on the clip, the two wings of the clip extending on a surface of dimensions substantially greater than said surface of the catch.

5. Spectacles according to claim 1, in which each eyepiece has such a curvature that the side-piece it bears extends in the prolongation of said second end of the eyepiece.

* * * * *